United States Patent [19]

Tarnay et al.

[11] Patent Number: 5,050,633
[45] Date of Patent: Sep. 24, 1991

[54] FLUID VALVE

[75] Inventors: Matthew G. Tarnay, Pasadena; Teodoro J. Gonzalez, Canyon Country, both of Calif.

[73] Assignee: Emhart Inc., Newark, Del.

[21] Appl. No.: 629,047

[22] Filed: Dec. 14, 1990

Related U.S. Application Data

[63] Continuation of Ser. No. 368,003, Jun. 19, 1989, abandoned.

[51] Int. Cl.$^5$ .......................... F16K 1/02; F16K 1/34
[52] U.S. Cl. .................. 137/454.5; 251/368; 251/218; 251/274
[58] Field of Search ............ 251/368, 218, 274, 464.5, 251/454.6

[56] References Cited

U.S. PATENT DOCUMENTS

| | | |
|---|---|---|
| 898,377 | 9/1908 | Karns . |
| 1,825,028 | 9/1931 | Townhill . |
| 2,625,362 | 1/1953 | Evans . |
| 3,010,471 | 11/1961 | Gross . |
| 3,603,349 | 9/1971 | Botnick ........................... 251/368 X |
| 3,830,464 | 8/1974 | Parker . |
| 4,317,573 | 3/1982 | Karkkainen . |
| 4,363,466 | 12/1982 | Bartlett . |
| 4,384,705 | 5/1983 | Kato . |
| 4,484,596 | 11/1984 | Hikade et al. . |
| 4,493,338 | 1/1985 | Petursson ..................... 137/454.5 X |
| 4,503,878 | 3/1985 | Taylor ......................... 137/454.6 X |
| 4,515,344 | 5/1985 | Gemignani . |
| 4,763,876 | 8/1988 | Oda et al. ........................ 251/368 X |
| 4,799,646 | 1/1989 | Rollett . |

Primary Examiner—Arnold Rosenthal
Attorney, Agent, or Firm—Barry E. Deutsch; J. Bruce Hoofnagle

[57] ABSTRACT

A fluid valve includes a valve body having a fluid inlet and a fluid outlet. A valve seat formed from the valve body between the fluid inlet and fluid outlet for the passage of fluid therebetween. A movable valve member formed from ceramic material is positioned in the valve body between the valve seat and the fluid outlet for controlling the flow of fluid through the valve seat. The valve member is axially movable relative to the valve seat, with the quantity of fluid flowing through the seat to the fluid outlet being directly proportional to the distance between the valve member and the valve seat.

9 Claims, 1 Drawing Sheet

FLUID VALVE

This is a Continuation of application Ser. No. 07/368,003, filed June 19, 1989, now abandoned.

BACKGROUND OF THE INVENTION

The present invention relates to a fluid valve used in a faucet and in particular to such a faucet which utilizes two non-resilient members to regulate the flow of fluid through the faucet.

Present fluid valves used in faucets typically incorporate resilient seals to control and/or shut off the flow of fluid therethrough. Although resilient seals are effective in shutting off the flow of fluid, they have a number of deficiencies. For example, resilient seals wear with use and their resilient properties deteriorate with time due to exposure to the variable temperature fluid medium and the degrading effect thereof. This deterioration results in premature failure of the seal resulting in leaks and a loss in performance.

Another unwanted characteristic of resilient seals is the effect of thermal expansion on valve performance. In valve configurations where the flow rate of the fluid medium is controlled by the flow area regulated by the resilient seal, expansion and contraction of this seal due to fluid thermal variation will affect the flow area, either reducing or increasing the flow depending on the direction of change of the temperature of the fluid medium. This phenomenon when changing from a low to a high temperature is commonly referred to in the plumbing trade as "hot water shut-off" where flow of the water is severely restricted.

Another type of prior art valve is commonly referred to as a shear plate type wherein two plates are used to control the flow of fluid medium and the two relatively movable plates are always in contact with each other. Such continuous contact between the plates creates frictional drag. Also, full contact type shear disc valves have a "dead band" zone resulting from the overlap condition of the openings between the stationary and movable discs.

The valve in accordance with the present invention eliminates the "hot water shut-off" condition common with resilient seal valves because the hard ceramic material forming the non-resilient discs has a low coefficient of expansion. Accordingly, the flow area created by the two discs stays constant over extreme variations in fluid temperatures.

Since the flow area for the fluid is directly proportional to the location of the movable disc relative to the stationery disc, the moment the valve is actuated to move the movable disc, fluid begins to flow through the valve. Prior art valves normally have an inherent "dead band" zone between the extreme mechanical shut-off position and the relative position of the discs of the valve when fluid begins to flow. The advantage of having a zero "dead band" zone is easier user operation since flow is predictable and instantaneous when the movable disc separates from the stationary disc.

It is accordingly an object of the invention to eliminate the deficiencies of the prior art resilient seal and shear plate type valves.

SUMMARY OF THE INVENTION

The foregoing object and other objects of the invention are attained in a fluid valve comprising a valve body having a fluid inlet and a fluid outlet; a valve seat formed from ceramic material disposed within the valve body between the fluid inlet and fluid outlet for the passage of fluid therebetween; and a movable valve member formed from ceramic material and positioned in the valve body between the valve seat and the fluid outlet for controlling the flow of fluid through the valve seat to said fluid outlet, said valve member being axially movable relative to said valve seat, with the quantity of fluid flowing through said seat to said fluid outlet being directly proportional to the distance between the valve member and valve seat.

DESCRIPTION OF THE PREFERRED EMBODIMENT

Figure 1:
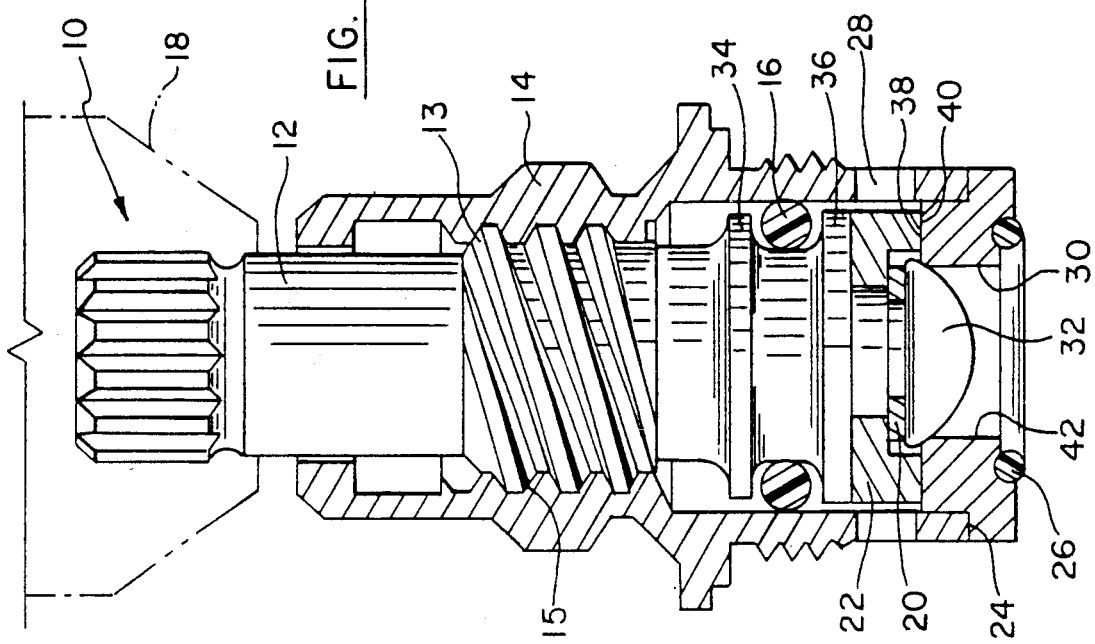
FIG. 1 is a longitudinal sectional view of a fluid valve in accordance with the present invention, with the parts thereof positioned so that fluid flows from the fluid inlet to the fluid outlet thereof.

Referring now to the drawing, there is disclosed a preferred embodiment of the present invention. In referring to the various figures of the drawing, like numerals shall refer to like parts.

Figure 2:
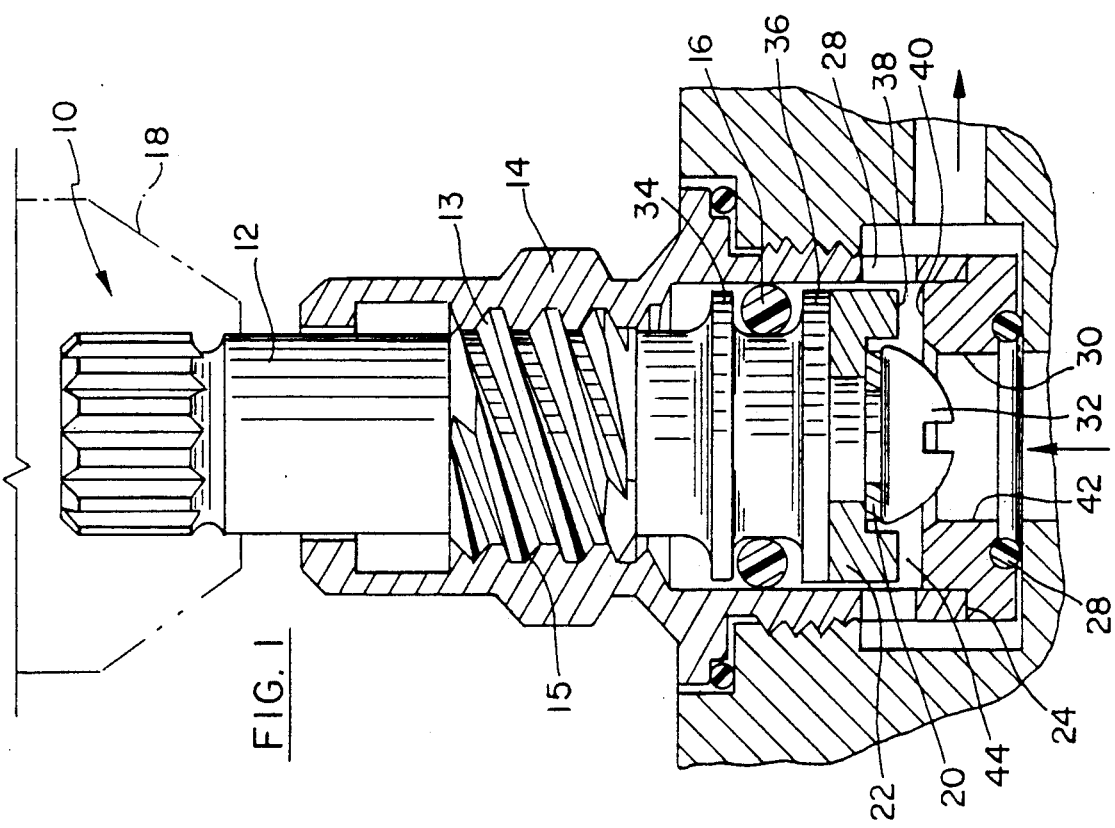
FIG. 2 is a view similar to that illustrated in FIG. 1 showing the parts of the fluid valve in a closed position.

In FIGS. 1 and 2, there is illustrated a fluid valve 10 which includes a valve body 11, and a bonnet 14 having a threaded stem 12 mounted therein. Threads 13 on stem 12 mate with complimentary internal threads 15 on bonnet 14 to provide for axial movement of the stem relative to the bonnet. Stem 12 includes a faucet handle 18 at its upper end to enable a user to move the stem axially to control the flow of fluid through valve 10.

Stem 12 includes opposed flange like surfaces 34, 36 which mount therebetween a seal ring 16, illustrated as a conventional 0-ring. The seal ring is made from elastomeric material such as rubber or neoprene. A first or top plate 22 is mounted to the underside of stem 12 by suitable means such as retaining screw 32.

Fluid valve 10 includes a first fluid flow opening 28 and a second fluid flow opening 30 disposed at right angles to the first open. In the preferred embodiment opening 28 serves as a fluid flow outlet and opening 30 serves as a fluid flow inlet for the flow of fluid through valve 10.

Valve 10 includes a second or bottom plate 24 mounted at the bottom of bonnet 14. Plate 24 defines the valve seat for valve 10 and includes an axially extending bore 42 which communicates with inlet 30. Plate 24 is fixed in position and plate 22 is movable with stem 12. Both of the plates are made from ceramic material, such as aluminum oxide, for a reason to be more fully discussed hereinafter. Faucet 10 includes a second seal ring 26, illustrated as an 0-ring. Seal ring 26 is also made from elastomeric material such as rubber or neoprene.

FIG. 2 illustrates valve 10 in its closed position; that is flow of fluid from inlet 30 to outlet 28 is prevented. In the closed position, it will be noted that opposed faces 38 and 40 respectively of top plate 22 and bottom plate 24 are in intimate contact to prevent fluid flow therebetween. Surfaces 38 and 40 are highly polished to provide surfaces that are uniformly smooth and flat so that leakage between the surfaces is prevented when the valve is in its closed position.

FIG. 1 illustrates the valve in an open position; that is fluid flows from inlet 30 to outlet 28 through bore 42. It will be noted that when the valve is in its fluid open position, valve stem 12 is axially moved upwardly with respect to bonnet 14 which creates an axial space 44 between opposed surfaces 38 and 40 of the top and bottom plates. The quantity of fluid flowing through inlet 30 to outlet 28 is proportional to the axial distance between top plate 22 and bottom plate 24.

The fluid valve of the present invention eliminates the utilization of resilient seals to control and/or shut off the flow of fluid through the valve. The valve relies upon the intimate contact between opposed spaces 38 and 40 of plates 22 and 24 to shut off the flow of fluid. Elimination of resilient seals concomitantly eliminates problems inherently associated therewith, such as wear and deterioration of the seals due to the seals exposure to a variable temperature fluid medium; and "hot water shut off" due to expansion and contraction of the resilient seal in response to thermal variations in the fluid.

As indicated previously, plates 22 and 24 are formed from ceramic materials, such as alumina oxide. A ceramic material has a low coefficient of expansion and thus the flow area created by relative movement between the two plates stays constant irrespective of variations in fluid temperature.

Further, because the flow area is proportional to the relative location of the movable plate to the stationary plate when the valve is actuated to create a flow area therebetween, fluid flows substantially instantaneously from the inlet to the outlet. Thus, the "dead band" zone between the extreme mechanical shut off position and the position when fluid begins to flow that exists in conventional valves has been eliminated. The elimination of such "dead band" zone results in easier user operation since flow through the valve is predictable and substantially instantaneous when the top plate is separated from the bottom plate.

As a further advantage, since the plates are separated to create a fluid flow area when the valve is open, there is essentially no friction between the opposed surfaces of the plate to create wear.

Since bottom plate 24 also functions as a mechanical stop to prevent excessive axial movement of stem 12, the mechanical stop position and the flow shut off position are thus coincident. This concept of a fluid valve design results in lower cost since manufacturing tolerances do not affect the relationship of the mechanical stop and flow shut off position.

A further advantage of the present valve over the prior art valves such as the shear type plate valve and resilient seal valve is developed through the axial separation between plates 22 and 24 to create a fluid flow area. The foregoing allows contaminants to flush through the valve without damaging sealing surfaces. The resilient materials forming the prior art resilient valves are subject to damage when particles are trapped between the sealing surfaces. In shear type valves, particles may lodge between the opposed surfaces of the two plates which may damage the plates when the plates are rotated relative to each other. The valve of the present invention enables particles to be carried past the sealing point since the sealing surfaces of the top and bottom plates are fully separated when fluid is flowing from inlet to outlet.

While a preferred embodiment of the present invention has been described and illustrated, the invention should not be limited thereto but may be otherwise embodied within the scope of the following claims.

We claim:

1. A fluid valve for use with a faucet system for controlling the flow of water, comprising:
    a bonnet having a first opening at one end thereof and a second opening at another end thereof with a communicating passageway therebetween along an axis of the bonnet;
    the bonnet formed with a third opening which is in communication with the passageway;
    a stem having a first end, a second end and a central body all integrally formed along an axis thereof;
    the first end and the central body of the stem being located for movement within the first opening of the bonnet along the axis thereof and extending through at least a portion of the passageway and movable therein;
    a valve seat formed from ceramic material and having an opening therethrough;
    at least portions of the valve seat being removably located within the second opening of the bonnet and other portions of the valve seat extending outside of the bonnet adjacent the second opening thereof;
    the opening of the valve seat being in communication with the passageway and the second opening of the bonnet to allow for the flow of water between the second and third openings of the bonnet and through the opening of the valve seat;
    the valve seat being shaped in a disc-like configuration and having a flat polished surface located in a first flat plane perpendicular to the axis of the stem;
    means formed on the bonnet for mounting the bonnet on a support body of the faucet system;
    the bonnet being formed with structure to facilitate the capture of the valve seat between the bonnet and the support body upon assembly of the bonnet on the support body;
    a sealing member formed from ceramic material and firmly secured to the first end of the stem and positioned to engage at least portions of the valve seat to cover and seal the opening of the valve seat and thereby prevent the flow of water between the second and third openings of the bonnet; and
    the sealing member being shaped in a disc-like configuration and having a flat polished surface located in a movable flat plane perpendicular to the axis of the stem;
    a faucet handle mounted on the second end of the stem externally of the bonnet for facilitating movement of the stem relative to the bonnet to move the flat polished surface of the sealing member into sealing engagement with the flat polished surface of the valve seat when the faucet is in assembly with the support body and to move the valve seat outwardly from the second opening of the bonnet and thereby move the valve seat from assembly with the bonnet when the faucet is not in assembly with the support body.

2. A fluid valve in accordance with claim 1 wherein the ceramic material is alumina oxide.

3. A fluid valve in accordance with claim 2 wherein the second and third openings of the bonnet are disposed at substantially 90 degrees with respect to each other.

4. A fluid valve in accordance with claim 3 wherein the valve seat is substantially ring-like in shape, with the sealing member having an annular surface for engagement with the ring-like surface of said valve seat for discontinuing flow of fluid between the second and third openings of the bonnet.

5. A fluid valve in accordance with claim 1 wherein the second and third openings of the bonnet are disposed at substantially 90 degrees with respect to each other.

6. A fluid valve in accordance with claim 5 wherein the valve seat is substantially ring-like in shape, with the sealing member having an annular surface for engagement with the ring-like surface of said valve seat for discontinuing flow of fluid between the second and third openings of the bonnet.

7. A fluid valve as set forth in claim 1, which further comprises:
  means for rotatably moving the stem within the bonnet to relatively urge the valve seat and the sealing member into sealing engagement as the stem is moved to firmly move the sealing member into engagement with the valve seat.

8. A fluid valve as set forth in claim 1 which further comprises:
  means contained within the valve body for applying a rigid mechanical force to the movable element to maintain the sealing member in firm sealing engagement with the valve seat independently of the need for any force external of the valve body.

9. A fluid valve as set forth in claim 8 wherein the applying means includes threads formed on an interior wall of the bonnet in complimentary mesh with threads formed on an exterior surface of the stem.

* * * * *